(12) United States Patent
Urabe et al.

(10) Patent No.: US 8,651,160 B2
(45) Date of Patent: Feb. 18, 2014

(54) ROBOT SYSTEM AND METHOD OF MANUFACTURING PROCESSED PRODUCT

(75) Inventors: Katsunori Urabe, Kitakyushu (JP);
Kenichi Motonaga, Kitakyushu (JP);
Keigo Ishibashi, Kitakyushu (JP);
Takashi Shiino, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 273 days.

(21) Appl. No.: 13/021,788

(22) Filed: Feb. 7, 2011

(65) Prior Publication Data

US 2011/0290090 A1    Dec. 1, 2011

(30) Foreign Application Priority Data

May 28, 2010   (JP) ................................. 2010-123360

(51) Int. Cl.
*B29C 65/00* (2006.01)
*B32B 37/00* (2006.01)
*B32B 38/00* (2006.01)
*B32B 38/04* (2006.01)
*B32B 38/18* (2006.01)

(52) U.S. Cl.
USPC ........... 156/367; 156/250; 156/252; 156/256; 156/350; 156/510; 156/516; 156/517; 156/518; 156/519; 156/520; 901/30; 901/31; 901/43

(58) Field of Classification Search
USPC ......... 156/250, 252, 256, 510, 516, 517, 518, 156/519, 520, 349, 367; 901/31, 43
See application file for complete search history.

(56) References Cited

U.S. PATENT DOCUMENTS

| 5,127,974 A * | 7/1992 | Tomiyama et al. ............. 156/85 |
| 2006/0283541 A1 * | 12/2006 | Mendez et al. ............... 156/250 |
| 2007/0284046 A1 | 12/2007 | Habisreitinger et al. |
| 2008/0236870 A1 * | 10/2008 | Kuwajima et al. .......... 174/126.2 |

FOREIGN PATENT DOCUMENTS

| JP | 2005-119367 | 5/2005 |
| JP | 2005-231789 | 9/2005 |
| JP | 2007-530336 | 11/2007 |
| JP | 2009-000799 | 1/2009 |

OTHER PUBLICATIONS

Japanese Office Action for corresponding JP Application No. 2011-240358, Feb. 22, 2013.
Japanese Office Action for corresponding JP Application No. 2011-240359, Feb. 22, 2013.
Japanese Office Action for corresponding JP Application No. 2010-123360, Sep. 27, 2011.

* cited by examiner

Primary Examiner — Mark A Osele
Assistant Examiner — Christopher C Caillouet
(74) Attorney, Agent, or Firm — Ditthavong Mori & Steiner, P.C.

(57) ABSTRACT

To automatically perform an attachment work of a material supply to a target object, a robot system includes a robot provided with a body, a first arm provided for the body and having a plurality of joints, a second arm provided for the body separately from the first arm and having a plurality of joints, and hand units respectively provided for the first arm and the second arm. The robot holds one of a plurality of types of workpiece components using the hand units of the first arm and the second arm at the same time, and the remaining type of the workpiece components is held and carried by the hand unit of the first arm or the second arm.

11 Claims, 9 Drawing Sheets

ROBOT SYSTEM AND METHOD OF MANUFACTURING PROCESSED PRODUCT

CROSS-REFERENCE TO RELATED APPLICATION

The present application claims priority under 35 U.S.C. §119 to Japanese Patent Application No. 2010-123360, filed May 28, 2010. The contents of this application are incorporated herein by reference in their entirety.

BACKGROUND OF THE INVENTION

1. Field of the Invention

The present invention relates to a robot system and a method of manufacturing a processed product.

2. Description of the Related Art

Japanese Patent Laid-Open Publication No. 2009-000799 and such propose a technique for automating a production line by using a robot to carry out a work that has been carried out by a person.

In addition to such a technique, there is an increased demand for streamlining production facilities for a wide variety of products in small lots by automating various complicated human-intensive works using a versatile robot instead of a specialized machine. This requires expansion of works that can be automated using robots.

SUMMARY OF THE INVENTION

According to one aspect of the present invention, a robot system that attaches a material supply to a target object includes: a first arm having a first hand mechanism; a second arm having a second hand mechanism; and a control device, wherein the control device operates the first hand mechanism to feed the material supply, and operates the second hand mechanism to press the fed material supply against the target object.

According to another aspect of the present invention, a method of manufacturing a processed product includes the steps of: preparing a robot provided with a first arm having a first hand mechanism and a second arm having a second hand mechanism; placing a target object on a stage provided near the robot, the target object being a component of the processed product; feeding the material supply from the first hand mechanism; and pressing the fed material supply against the target object using the second hand mechanism.

BRIEF DESCRIPTION OF THE DRAWINGS

The present invention will be described in further detail with reference to the accompanying drawings wherein:

FIGS. 6A and 6B are both illustrations of the embodiment.

DETAILED DESCRIPTION OF THE EMBODIMENTS

Entire Structure

The following describes an embodiment according to the present invention with reference to the drawings.

This embodiment describes one example of a robot system that carries out a process of applying a masking tape T as a material supply to a previously set position of a substrate of an electronic device as a target object (hereinafter referred to as a workpiece W).

In this case, the substrate of the electronic device is not yet loaded with an electronic component, and is to be soldered at a portion without the masking in a soldering step as a post process after the robot system of this embodiment applies the masking tape T to the previously set position.

Figure 1:
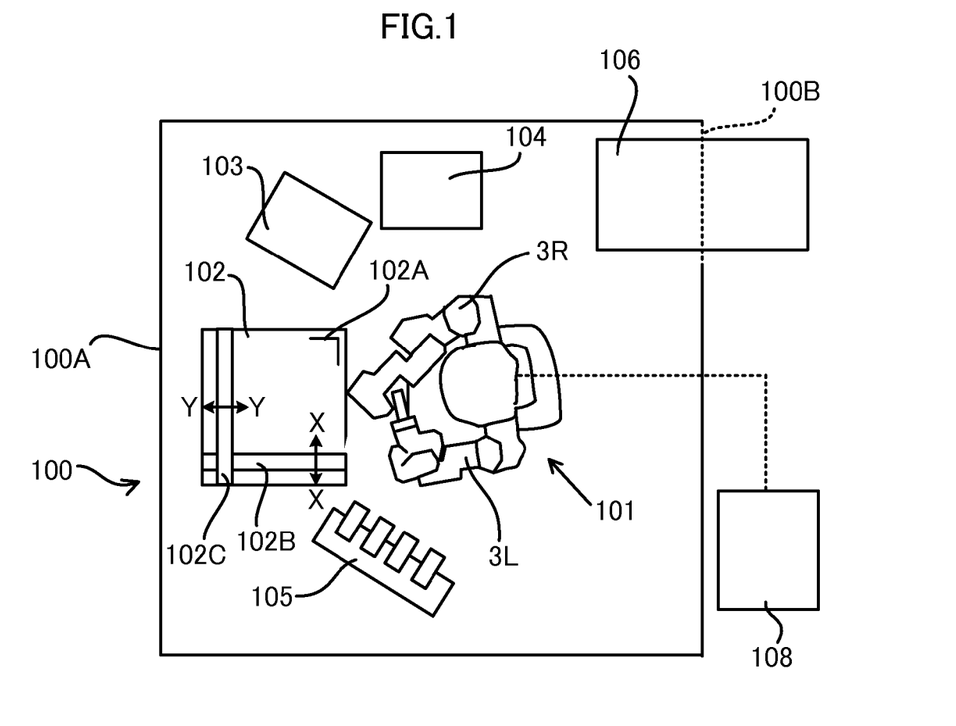
FIG. 1 is a top view schematically illustrating an entire structure of a processing system according to an embodiment.

As shown in FIG. 1, a robot system 100 according to the embodiment includes a robot main body 101 disposed within a partition wall 100A, a stage 102, a pre-processed workpiece cartridge 103, a post-processed workpiece cartridge 104, and a winding roller container 105. Further, the partition wall 100A is provided with a gate 100B, and a carrier path 106 is provided through the gate 100B in and outside the partition wall 100A. Moreover, a robot controller (control device) 107 is provided outside the partition wall 100A, and connected to the robot main body 101 so as to allow transmission of information.

Structure of Robot Main Body

Figure 2:
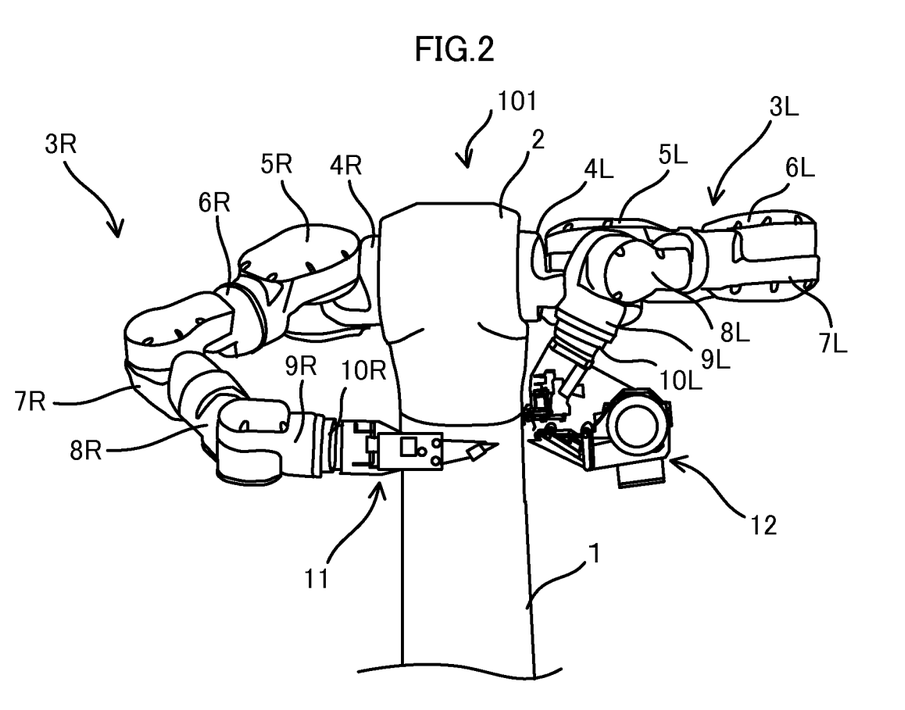
FIG. 2 is an elevational view schematically illustrating a main portion of a robot device according to the embodiment.

As shown in FIG. 2, the robot main body 101 is configured such that a base 1 is fixed to a floor by an anchor bolt that is not depicted in the figure, and a body 2 is provided on the base 1 pivotally with respect to the base 1 via an actuator.

The body 2 is provided with a first arm 3L and a second arm 3R (also functions as a carry-in device and a carry-out device in this embodiment) respectively on a left side and a right side.

The second arm 3R is provided with a right shoulder 4R pivotally about a rotation axis parallel to a plane on which the base 1 is disposed. The right shoulder 4R is provided with a right upper arm section-A 5R swingably about a rotation axis perpendicular to the rotation axis of the right shoulder 4R. The right upper arm section-A 5R is provided with a right upper arm section-B 6R rotatably about a rotation axis perpendicular to the rotation axis of the right upper arm section-A 5R.

Further, near a tip end of the right upper arm section-B 6R, a right lower arm 7R is provided swingably about a rotation axis perpendicular to the rotation axis of the right upper arm section-B 6R. At a tip end of the right lower arm 7R, a right wrist section-A 8R is provided swingably about a rotation axis perpendicular to the rotation axis of the right lower arm 7R.

At a tip end of the right wrist section-A 8R, a right wrist section-B 9R is provided rotatably about a rotation axis perpendicular to the rotation axis of the right wrist section-A 8R.

At a tip end of the right wrist section-B 9R, a right flange 10R is provided rotatably about a rotation axis perpendicular to the rotation axis of the right wrist section-B 9R, and a right hand unit (second hand mechanism) 11 is attached to the right flange 10R.

The first arm 3L and the second arm 3R are bilaterally symmetric. The first arm 3L is provided with a left shoulder 4L pivotally about a rotation axis parallel to a plane on which the base 1 is disposed. The left shoulder 4L is provided with a left upper arm section-A 5L swingably about a rotation axis perpendicular to the rotation axis of the left shoulder 4L. The left upper arm section-A 5L is provided with a left upper arm section-B 6L rotatably about a rotation axis perpendicular to the rotation axis of the left upper arm section-A 5L.

Further, near a tip end of the left upper arm section-B 6L, a left lower arm 7L is provided swingably about a rotation axis perpendicular to the rotation axis of the left upper arm section-B 6L. At a tip end of the left lower arm 7L, a left wrist section-A 8L is provided swingably about a rotation axis perpendicular to the rotation axis of the left lower arm 7L.

At a tip end of the left wrist section-A 8L, a left wrist section-B 9L is provided rotatably about a rotation axis perpendicular to the rotation axis of the left wrist section-A 8L.

At a tip end of the left wrist section-B 9L, a left flange 10L is provided rotatably about a rotation axis perpendicular to the rotation axis of the left wrist section-B 9L, and a left hand unit (first hand mechanism) 12 is attached to the left flange 10L.

The left hand unit (first hand mechanism) 12 is attached to the left flange 10L. Each of joints (the rotating sections, the pivoting sections, and the hand unit) in the robot main body 101 includes a built-in actuator having a servomotor (not shown in the drawings), and a rotation position of each movable section is inputted to the controller 107 as a signal from an encoder within the actuator.

Detailed structures of the right hand unit 11 and the left hand unit 12 will be described later.

As shown in FIG. 1, the stage 102 is disposed in front of the robot main body 101, and provided with a flat work table on which the workpiece W is placed. At one corner of the work table, a positioning wall 102A having a right-angled shape is disposed upright. Further, the stage 102 is provided with a movable member 102B and a movable member 102C that are driven by an actuator that is not shown in the figure so as to respectively slide in an X-X direction (hereinafter also referred to as a right-and-left direction) and in a Y-Y direction (hereinafter also referred to as a back-and-forth direction).

The pre-processed workpiece cartridge 103 is configured to contain more than one pre-processed workpiece W. Further, the post-processed workpiece cartridge 104 is a container having a plurality of slots each configured to contain the workpiece W that has been post-processed.

The winding roller container 105 is provided with a plurality of types of winding roller mechanisms 38 as will be described later. The winding rollers 36 for masking tapes of different widths, materials and such are respectively loaded on the winding roller mechanisms 38.

The controller 107 is configured by a computer having a storage device, an electronic computing unit, and an input device (all of which are not depicted in the drawings), and connected to the robot main body 101 so as to allow transmission of information.

The controller 107 is previously instructed how to carry out a process operation to the workpiece W (more specifically, such as information on a type of the masking tape and a position of the workpiece W to be applied) via the input device (e.g., a programming pendant). When carrying out the operation, the controller 107 supplies an operation signal to each movable section of the robot main body 101 according to the instructed operation.

In this case, for the sake of the simplicity of the explanation, the controller 107 as the control device is represented and described as a single body in this embodiment. However, the control device can be configured as a robot controller that controls driving of the robot main body 101 only, separately from the computer that controls the hand unit and the like.

Structure of Second Hand Unit

Next, a structure of the right hand unit 11 is described in further detail.

Figure 3:
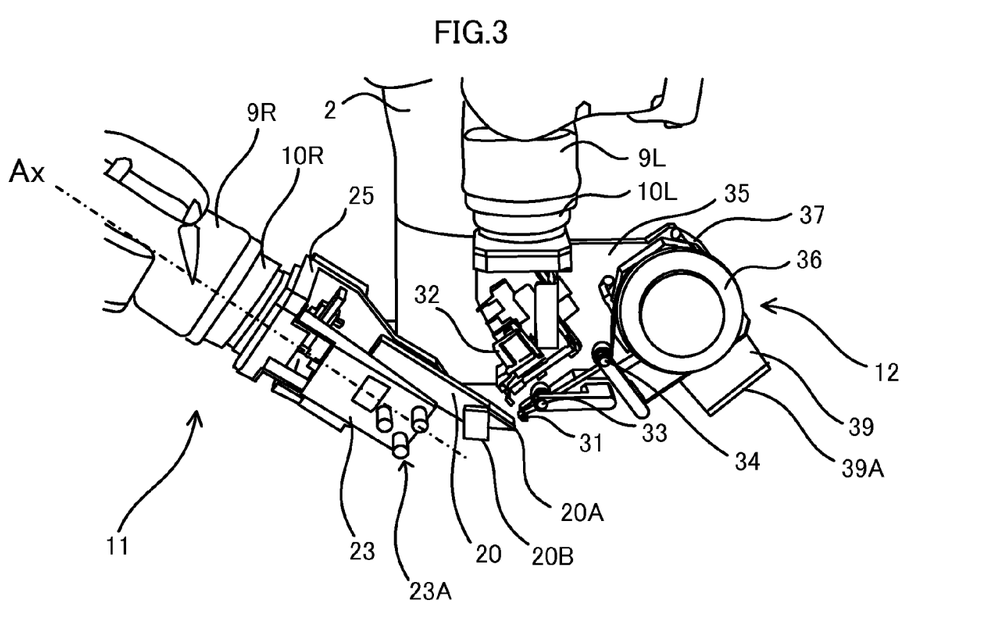
FIG. 3 is an elevational view schematically illustrating a main portion of a first hand mechanism and a second hand mechanism according to the embodiment.
Figure 4:
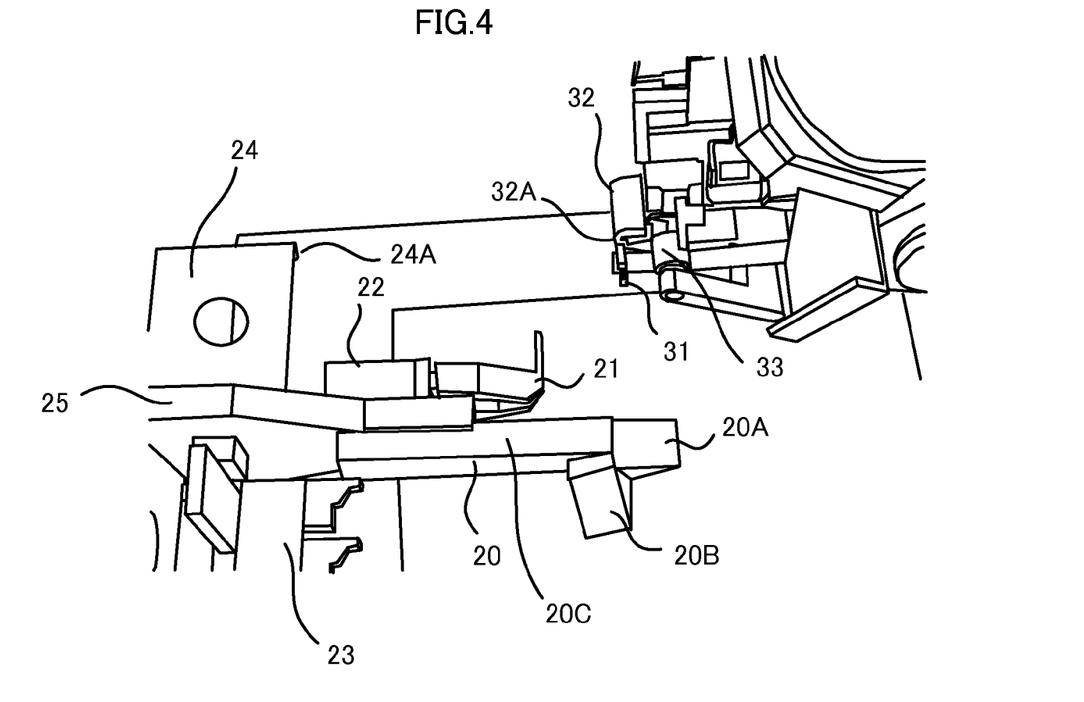
FIG. 4 is a top view schematically illustrating the main portion of the first hand mechanism and the second hand mechanism according to the embodiment.

As shown in FIG. 3 and FIG. 4, the right hand unit 11 is provided with a pressing mechanism 20, a second gripping mechanism 21, an actuator 22, a pre-processed workpiece gripping mechanism (target object gripping mechanism) 23, a post-processed workpiece gripping mechanism (target object gripping mechanism) 24, and a bracket 25.

The bracket 25 is fixed to the right flange 10R, and the pressing mechanism 20, the second gripping mechanism 21, the actuator 22, the pre-processed workpiece gripping mechanism 23, and the post-processed workpiece gripping mechanism 24 are attached to the bracket 25.

The pressing mechanism 20 is configured by a pair of pressing claws 20A and 20B and a base portion 20C, and the base portion 20C fixed to the bracket 25 extends along a direction substantially identical with a rotation axis Ax of the right flange 10R.

At a tip end of the base portion 20C, the pressing claw 20A extends along a longitudinal direction of the base portion 20C. The pressing claw 20A has a shape in a triangular prism, and its tip end forms an acute angle and its base end is connected to the base portion 20C.

The pressing claw 20B, similarly to the pressing claw 20A, also has a shape in a triangular prism and its tip forms an acute angle and its base end is connected to the base portion 20C. However, the pressing claw 20B extends along a direction substantially perpendicular to the pressing claw 20A.

In this case, the base portion 20C is made of metal, and both of the pressing claws 20A and 20B are made of resin.

Figure 5:
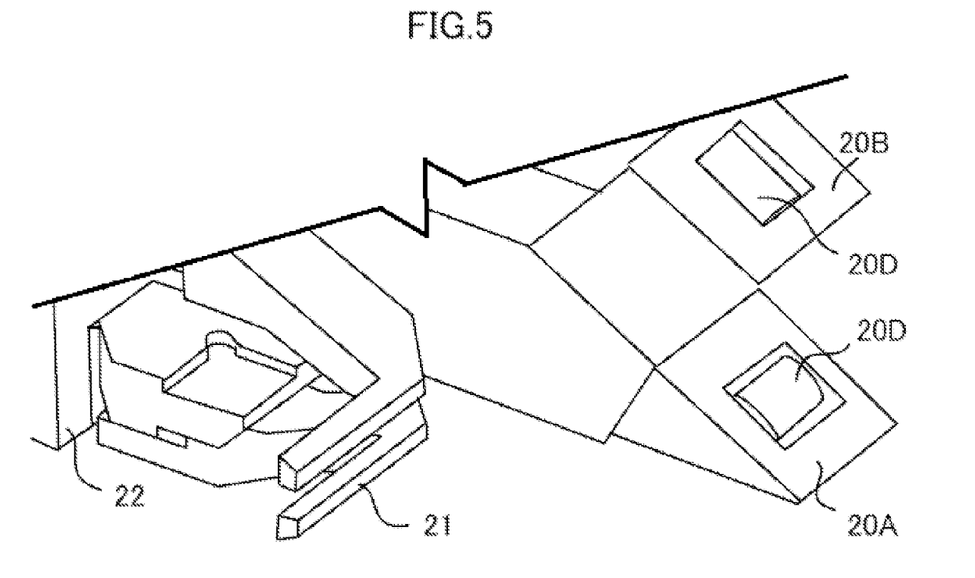
FIG. 5 is a partial schematic illustration of the embodiment, illustrating a tip end portion of a second hand unit.

Further, FIG. 5 illustrates the pressing mechanism 20 in a state in which the right flange 10R is pivoted on the order of 180 degrees from a state illustrated in FIG. 4.

As shown in FIG. 5, a driven roller 20D is pivotally supported on a surface of each of the pressing claws 20A and 20B with which the masking tape T is brought into contact. The driven roller 20D is driven to rotate according to a change in a relative position between the pressing claws 20A and 20B and the workpiece W (or the masking tape T) when moving a workpiece while the masking tape T is pressed against the workpiece, as will be described later.

The second gripping mechanism 21 is a forceps shaped member that extends in parallel with the base portion of the pressing mechanism 20 from the actuator 22 fixed to the bracket 25, and that is provided with a gripper 21A that is flexed substantially at a right angle. Switching between gripping and ungripping based on the driving of the actuator 22 allows the second gripping mechanism 21 to grip and ungrip the masking tape T by sandwiching the masking tape T.

The pre-processed workpiece gripping mechanism 23 is provided with a plurality of (three, in this case) suction members 23A, and is able to hold and uphold the workpiece W by suctioning an upper surface of the workpiece W by the suction members 23A.

The post-processed workpiece gripping mechanism 24 is a member in a flat-plated shape fixed to the bracket 25, and provided with an engagement section 24A that has gone through a bending process at a tip end portion.

The workpiece W is provided with a hole that is not shown in the drawing. The workpiece W can be held by operating the second arm 3R and engaging the engagement section 24A of the post-processed workpiece gripping mechanism 24 with the hole of the workpiece W. With this, it is possible to hold the workpiece W without bringing the masking tape into contact with the surface of the workpiece W, and to prevent the masking tape T and such that is applied to the surface of the workpiece W from being damaged when carrying the post-processed workpiece W.

Structure of First Hand Unit

Next, a structure of the left hand unit 12 is described in further detail.

As shown in FIG. 3 and FIG. 4, the left hand unit 12 is provided with a cutting mechanism 32, a bracket 35, a detachment mechanism 37, the winding roller mechanism 38, and a cartridge gripper 39.

The cartridge gripper 39 is a member in a flat-plated shape fixed to the bracket 35, and provided with an engagement section 39A that has gone through a bending process at a tip end portion.

The cutting mechanism 32 is provided with a cutting blade 32A at a tip end portion, and configured to cut the masking tape T on a downstream side of a first gripping mechanism 31 (a feeding side of the masking tape T) that will be later described by sliding the cutting mechanism 32 upward and downward and moving the cutting blade 32A toward the masking tape T.

Figure 6A:
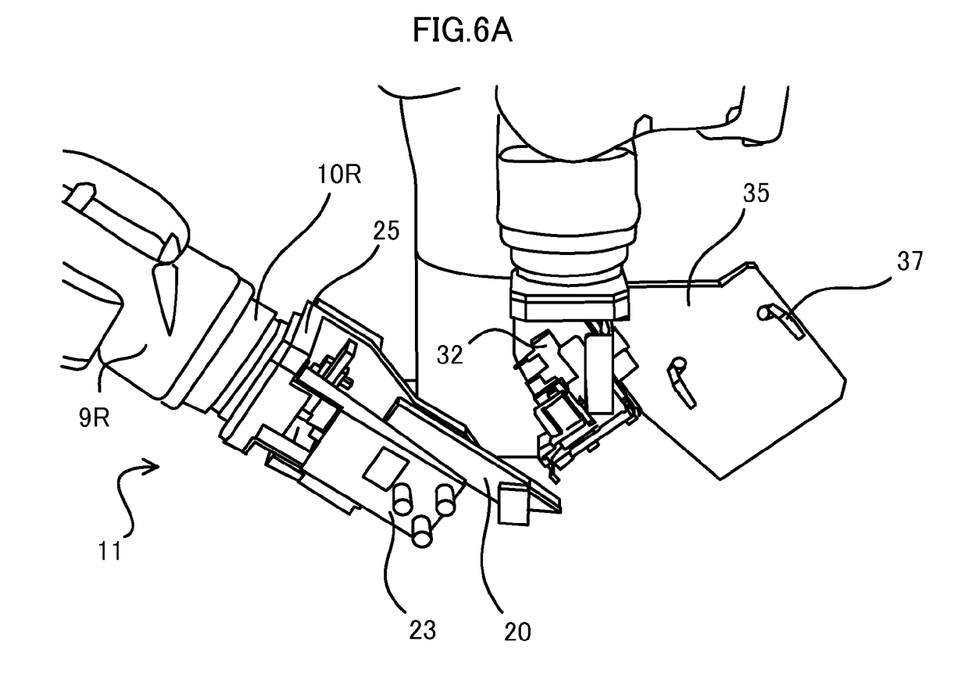
FIG. 6A shows a state in which a winding roller mechanism is dismounted from a first hand unit.

As shown in FIG. 6A, the winding roller mechanism 38 can be gripped and ungripped by the left hand unit 12 by means of the detachment mechanism 37.

Figure 6B:
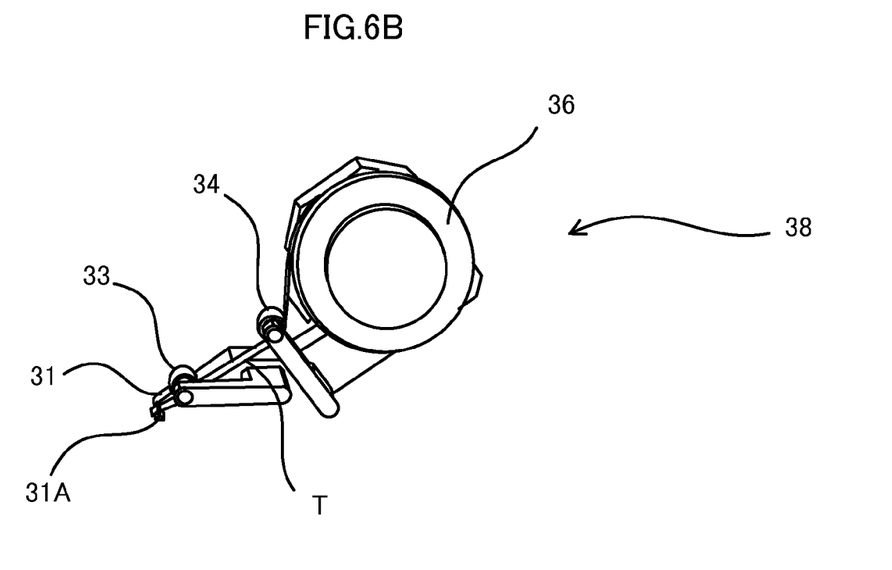
FIG. 6B shows the winding roller mechanism.

As shown in FIG. 6B, the winding roller mechanism 38 is configured by the winding roller 36 rotatably mounted to the main body, a pair of driven rollers 33 and 34 (guide rollers), and the first gripping mechanism 31.

The winding roller 36 is configured such that the masking tape T is wound around a core material. The two driven rollers 33 and 34 apply an appropriate tensile force to the masking tape T that is fed from the winding roller 36, and guide the masking tape T along a feeding direction of the masking tape T toward a side of the first gripping mechanism 31 of the tip end portion. Specifically, a feeding mechanism of the masking tape T is configured by the winding roller 36 and the driven rollers 33 and 34.

The first gripping mechanism 31 is a forceps shaped member that extends in parallel with the masking tape T, and that is provided with a gripper 31A that is flexed substantially at a right angle. Switching between gripping and ungripping based on the driving of an actuator (not shown in the drawings) allows the first gripping mechanism 31 to grip and ungrip the masking tape T by sandwiching the masking tape T.

The robot system 100 according to the one embodiment of the present invention is thus configured, and operated in the following manner according to instruction data that is previously set by the controller 107.

When starting the operation, the controller 107 operates the robot system 100 to hold the pre-processed workpiece cartridge 103 and the post-processed workpiece cartridge 104 that have been carried in the gate 100B by a carrier device that is not shown in the drawings by engaging the engagement section 24A of the right hand unit 11 and the engagement section 39A of the left hand unit 12 respectively with grooves of the cartridges 103 and 104, then carry the pre-processed workpiece cartridge 103 and the post-processed workpiece cartridge 104 to a previously set position shown in FIG. 1, and set the pre-processed workpiece cartridge 103 and the post-processed workpiece cartridge 104 at this position.

Then, the second arm 3R is driven and holds one of the workpieces W in the pre-processed workpiece cartridge 103 by pressing the suction members 23A against the surface of the workpiece W that is placed on the top, places the held workpiece W on the stage 102 with a surface to be processed of the workpiece W facing upward, and releases the suctioning by the suction members 23A.

After the workpiece W is placed on the stage 102, the movable members 102B and 102C are actuated to press the workpiece W against the positioning wall 102A, and whereby the operation for positioning the workpiece W on the stage 102 is completed.

In parallel with the operation for positioning the workpiece W on the stage 102, the first arm 3L is actuated, and one of the winding roller mechanisms 38 that has been set is mounted to the detachment mechanism 37 from the winding roller container 105.

Then, as shown in FIG. 4, the first arm 3L and the second arm 3R are moved to previously set positions (hereinafter referred to as standby positions) and in postures. As initial positions, offset positions are set such that the right hand unit 11 and the left hand unit 12 do not interfere with each other and the right hand unit 11 is positioned sufficiently forward from the left hand unit 12 (taking a direction moving away from the body 2 as "forward", and a direction moving toward the body 2 as "backward").

Figure 7:
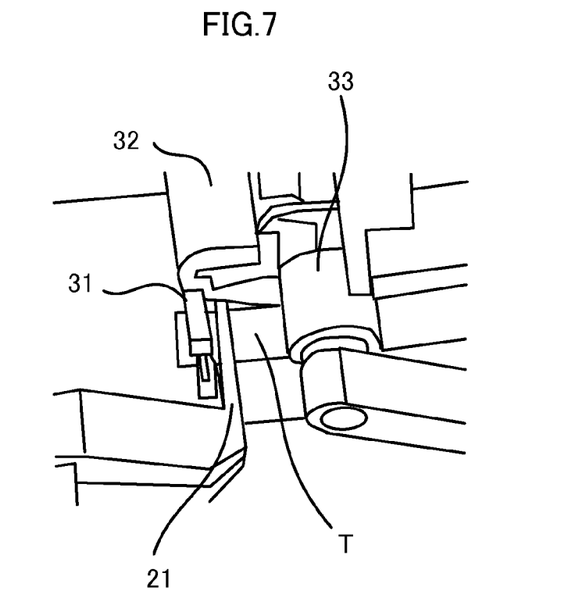
FIG. 7 is a schematic illustration of an operation of the processing system according to the embodiment.

Subsequently, the second arm 3R is operated, and in a state in which the second gripping mechanism 21 is open, as shown in FIG. 7, the gripper 21A goes into between the first gripping mechanism 31 and the driven roller 33 from the standby position, and then closes the second gripping mechanism 21 to sandwich and grip the masking tape T by the gripper 21A.

Upon completion of the gripping operation by the gripper 21A, the first gripping mechanism 31 is opened and the first gripping mechanism 31 ungrips the masking tape T.

The second arm 3R is moved to a side of the tip end of the masking tape T in a state in which the first arm 3L is fixed so as not to move, and the masking tape T is fed by a previously set length (by the length of application). At this time, the gripper 21A of the second gripping mechanism 21 passes between the grippers of the first gripping mechanism 31 that are opened without making contact with them.

After the masking tape T is fed, the first gripping mechanism 31 grips the masking tape T, and the masking tape T is released from the gripping by the second gripping mechanism 21.

Figure 8:
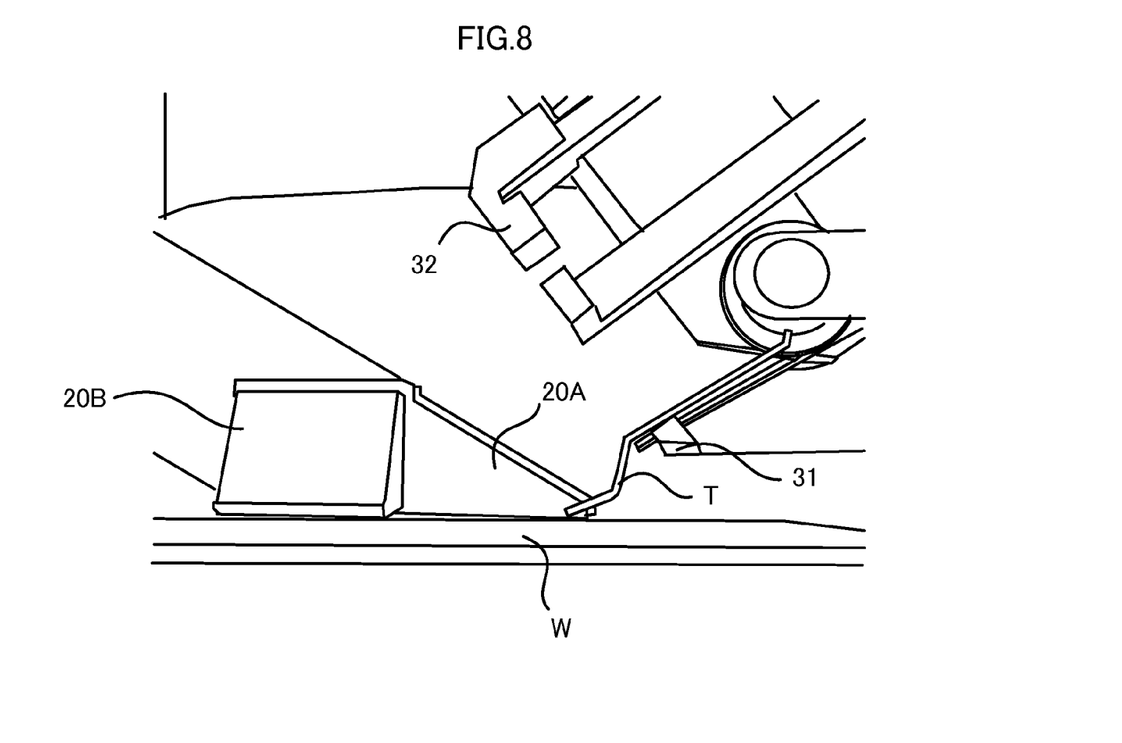
FIG. 8 is a schematic illustration of the operation of the processing system according to the embodiment.

Then, as shown in FIG. 3, the first arm 3L is moved to a previously set masking starting position, and subsequently, as shown in FIG. 8, the second arm 3R is operated to press an adhesive face of a tip end portion of the masking tape T that has been fed to the previously set position of the workpiece W using the pressing claw 20A.

It should be noted that the masking tape T is pressed against the workpiece W using the pressing claw 20A as this operation is for applying the masking tape T along the right-and-left direction (the direction in which the pressing mechanism 20 extends) in this example. However, when applying the masking tape T along the back-and-forth direction, the masking tape T is pressed against the workpiece W using the pressing claw 20B.

With this, whether a direction for applying the masking tape T is the right-and-left direction or the back-and-forth direction, it is possible to carry out the application operation while keeping the direction of the right hand unit 11 substantially the same.

Thus, without positioning both of the first arm 3L and the second arm 3R in the back-and-forth direction where the space is tight, it is possible to apply the masking tape T in the back-and-forth direction by positioning only the first arm 3L forward, and whereby a region in which the first arm 3L and the second arm 3R interfere with each other is limited to a small region.

Figure 9:
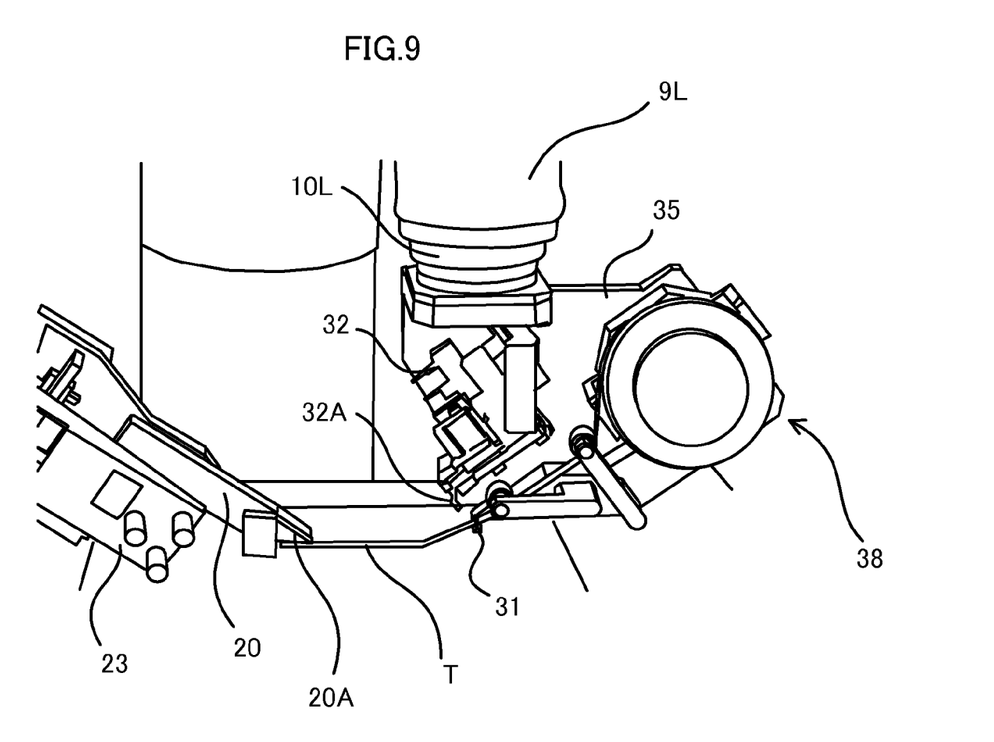
FIG. 9 is a schematic illustration of the operation of the processing system according to the embodiment.

Upon completion of the pressing operation of the masking tape T, as shown in FIG. 9, the first arm 3L and the second arm 3R are moved toward the right-and-left direction by a previously set length. At this time, the masking tape T is fed from the winding roller 36 along with the movement of the first arm 3L, and the fed masking tape T is pressed against the workpiece W by the pressing claw 20A and the driven roller 20D under the pressing claw 20A. With this, the masking tape T is applied to the workpiece W in a state in which the masking tape T is applied with a constant tensile force, and whereby it is possible to more effectively prevent wrinkles and such from occurring in the masking tape T.

Upon movement of the first arm 3L and the second arm 3R by the previously set length, the first gripping mechanism 31 is closed, the cutting mechanism 32 is actuated, and the cutting blade 32A cuts the masking tape T. Then, the first arm 3L retracts in the right-and-left direction.

Figure 10:
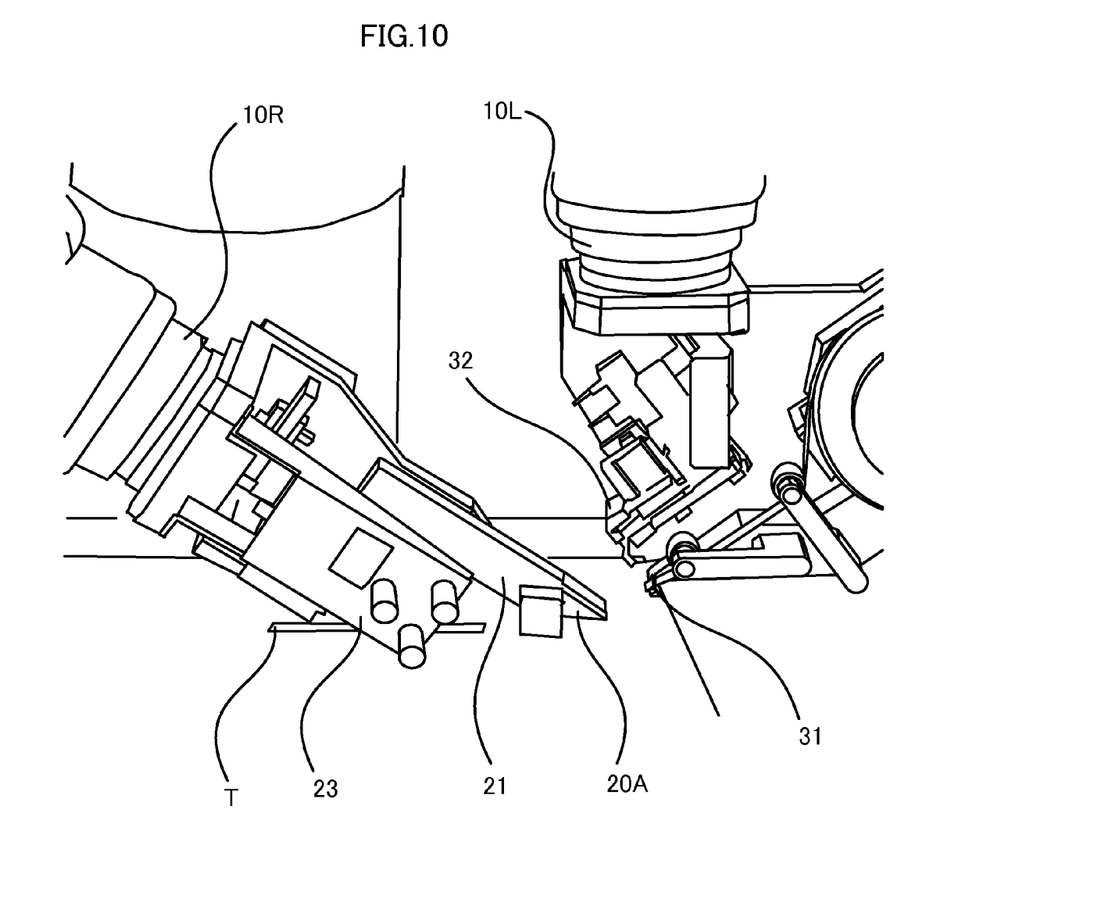
FIG. 10 is a schematic illustration of the operation of the processing system according to the embodiment.

Upon cutting of the masking tape T by the cutting blade 32A, as shown in FIG. 10, the second arm 3R moves toward the right-and-left direction by a previously set length and presses the masking tape T to its cut end against the workpiece W. Subsequently, the second arm 3R moves to at least the start of application of the masking tape T in a state in which a predetermined pressure is applied to the masking tape T by the pressing claw 20A, and sufficiently fixes the masking tape T to the workpiece W.

Upon completion of application of the masking tape T, the first arm 3L and the second arm 3R move to the standby positions.

Then, if it is necessary to exchange the winding roller mechanism 38, the winding roller mechanism 38 that is currently loaded is placed in the winding roller container 105, and one of the winding roller mechanisms 38 that is previously set is loaded. Then, the application operation to the previously set position of the masking tape T is again carried out.

Upon completion of the application operation of the masking tape T to all of the predetermined positions of the workpiece W, the workpiece W is held by engaging a hole in the workpiece W that is not shown with the engagement section 24A of the post-processed workpiece gripping mechanism 24, and the workpiece W to which the masking tape T is applied is contained in an empty slot of the post-processed workpiece cartridge 104.

Then, again, a new workpiece (pre-processed workpiece) W is picked out from the pre-processed workpiece cartridge 103, and the application operation of the masking tape T is carried out.

After the application process of the masking tape T to the workpiece W has been carried out and a previously set number of the workpieces W are contained in the post-processed workpiece cartridge 104, the post-processed workpiece cartridge 104 is gripped by the engagement section 24A of the right hand unit 11 and the engagement section 39A of the left hand unit 12, and transferred to the gate 100B side.

As described above, according to the robot system of the embodiment, it is not only possible to carry out the application operation of the masking tape T to the predetermined positions of the workpiece W without a human work at a high accuracy, but also possible to carry out the application operation in various modes by changing the content of the instruction to the controller 107.

Further, as the robot main body 101 takes a shape similar to that of a human body in which the base 1 and the body 2 correspond to a trunk of the human body and a pair of arms (arms) are provided on both sides of the trunk, it is possible to use existing facilities by placing the robot main body 101 in an existing work space for a human work, and whereby facility cost relating to the automation of the work can be reduced.

While the above described the embodiment according to the present invention, the robot system and the method of manufacturing a processed product according to the present invention is not limited to the above embodiment, and can be appropriately modified without departing the spirit of the present invention.

The target object according to the present invention is not limited to the substrate of the electronic device, and the present invention can be applied to various target objects. Further, as for the supply material, not limiting to the adhesive tape such as the masking tape, the present invention can be applied to any supply material, for example, a spacer such as a wire in a string and a fabric as long as it is possible to feed from the first arm.

Further, according to the embodiment, the robot main body is configured to serve both as the carry-in device and as the carry-out device. However, the carry-in device and the carry-out device for carrying the target object in and out of the stage can be independently provided.

What is claimed is:

1. A robot system that attaches a material supply to a target object, comprising:
   a first arm having a first hand mechanism;
   a second arm having a second hand mechanism; and
   a control device,
   wherein the control device is configured to operate the first hand mechanism to feed the material supply, and is configured to operate the second hand mechanism to press the fed material supply against the target object, and
   wherein the second hand mechanism includes a plurality of pressing mechanisms configured to press the material supply that has been fed from the first hand mechanism against the target object, the pressing mechanisms extend in directions nonparallel to each other; wherein the pressing mechanisms each includes a driven roller, and the driven rollers are respectively pivotally supported on nonparallel axes.

2. The robot system according to claim 1, wherein the first hand mechanism includes:
   a feeding mechanism configured to feed the material supply from an upstream side to a downstream side;
   a first gripping mechanism configured to grip a tip end portion of the material supply that has been fed from the feeding mechanism; and
   a cutting mechanism configured to cut the material supply on a downstream side from the first gripping mechanism, and
   the second hand mechanism includes:
   a second gripping mechanism configured to grip the material supply supported by the first hand mechanism
   one of the pressing mechanisms of the plurality of pressing mechanisms being configured to press a tip end portion of the material supply that has been fed from the first hand mechanism against the target object.

3. The robot system according to claim 2, wherein the control device:
- is configured to operate the second gripping mechanism to grip the material supply that is gripped by the first gripping mechanism,
- is configured to operate the first gripping mechanism to ungrip the gripping, and operates the first arm and the second arm in cooperation to feed the material supply,
- is configured to operate the second gripping mechanism to ungrip the gripping, and moves the first hand mechanism and the second hand mechanism to a previously set position,
- is configured to operate the second arm to cause the one of the pressing mechanisms to press the tip end portion of the material supply against the target object,
- is configured to operate the first arm to feed the material supply by a previously set length,
- is configured to operate the second arm to move the one of the pressing mechanisms toward the first hand mechanism in a state in which the material supply is pressed against the target object, and
- is configured to operate the first gripping mechanism to grip the material supply, and then operates the cutting mechanism to cut the material supply.

4. The robot system according to claim 2, wherein the one of the pressing mechanisms includes a driven roller configured to press the material supply against the target object.

5. The robot system according to claim 2, wherein the first gripping mechanism and the feeding mechanism are integrally provided,
the feeding mechanism includes:
- a winding roller holder loaded with a winding roller on which the material supply is wound,
- a guide roller configured to guide the material supply fed from the winding roller toward the first gripping mechanism, and
the first hand mechanism includes a detachment mechanism configured to detachably hold the first gripping mechanism and the feeding mechanism that are integrally provided.

6. The robot system according to claim 1, wherein a target object gripping mechanism configured to grip the target object is provided for one of the first hand mechanism and the second hand mechanism.

7. The robot system according to claim 1, comprising:
a stage provided near the robot device;
a carry-in device configured to carry the target object before processing into the stage;
a positioning device configured to fix the target object that has been carried in to the stage at a previously set position; and
a carry-out device configured to carry the target object after processing out from the stage.

8. The robot system according to claim 7, wherein
the target object is a substrate of an electronic device before soldering, and
the material supply is a masking tape that is applied to a surface of the substrate.

9. The robot system according to claim 1, wherein the control device is further configured to operate the first arm to feed the fed material supply further after the control device operates the second hand mechanism to press the fed material supply against the target object and before the fed material supply is cut.

10. The robot system according to claim 1,
wherein the first hand mechanism includes a cutting mechanism configured to cut the material supply, and
wherein the control device is further configured to operate the first arm to feed the fed material supply further after the control device operates the second hand mechanism to press the fed material supply against the target object and before the fed material supply is cut by the cutting mechanism.

11. A robot system that attaches a material supply to a target object, comprising:
a first arm having a first hand mechanism;
a second arm having a second hand mechanism; and
a control device is configured to control the operation of the first hand mechanism to feed the material supply and the second hand mechanism,
wherein the second hand mechanism includes a pressing mechanism configured to press a tip end portion of the material supply that has been fed from the first hand mechanism against the target object, and
wherein the second hand mechanism includes an additional pressing mechanism that extends in a direction that is nonparallel to the pressing mechanism; wherein the pressing mechanisms each includes a driven roller, and the driven rollers are respectively pivotally supported on nonparallel axes.

* * * * *